US008531739B2

(12) United States Patent
Kitai

(10) Patent No.: US 8,531,739 B2
(45) Date of Patent: Sep. 10, 2013

(54) READING APPARATUS

(75) Inventor: Satoshi Kitai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/938,162

(22) Filed: Nov. 2, 2010

(65) Prior Publication Data

US 2011/0128590 A1 Jun. 2, 2011

(30) Foreign Application Priority Data

Nov. 30, 2009 (JP) ................................ 2009-272798

(51) Int. Cl.
*H04N 1/04* (2006.01)
*H04N 1/40* (2006.01)
*H04N 1/32* (2006.01)

(52) U.S. Cl.
USPC ............................ 358/474; 358/446; 358/468

(58) Field of Classification Search
USPC ................. 358/1.15, 400, 1.9, 403, 448, 405, 358/409, 412, 435, 436, 474, 446, 468; 348/211.99
See application file for complete search history.

(56) References Cited

U.S. PATENT DOCUMENTS

2008/0129396 A1* 6/2008 Kato et al. ..................... 331/1 A
2009/0046162 A1* 2/2009 Bleau et al. .............. 348/211.99
2011/0063693 A1* 3/2011 Yoshigae ..................... 358/474

FOREIGN PATENT DOCUMENTS

JP 2003-324350 11/2003

* cited by examiner

*Primary Examiner* — Jerome Grant, II
(74) *Attorney, Agent, or Firm* — Fitzpatrick, Cella, Harper & Scinto

(57) ABSTRACT

A reading apparatus includes an image reading unit that reads an image line-by-line and generates an image signal, a signal processing unit that performs signal processing on the image signal, a reference clock generation unit that generates a reference clock signal, and a PLL unit that generates a driving clock signal from the reference clock signal to be supplied to one of the image reading unit, the signal processing unit, and the reference clock generation unit. Skew in the synchronization between the reference clock signal and a driving clock signal is detected, and in the case where skew in the synchronization has been detected during image reading operations performed by the image reading unit, the image reading unit is controlled to read the image having returned to a position that is a predetermined number of lines previous to the current reading position.

15 Claims, 10 Drawing Sheets

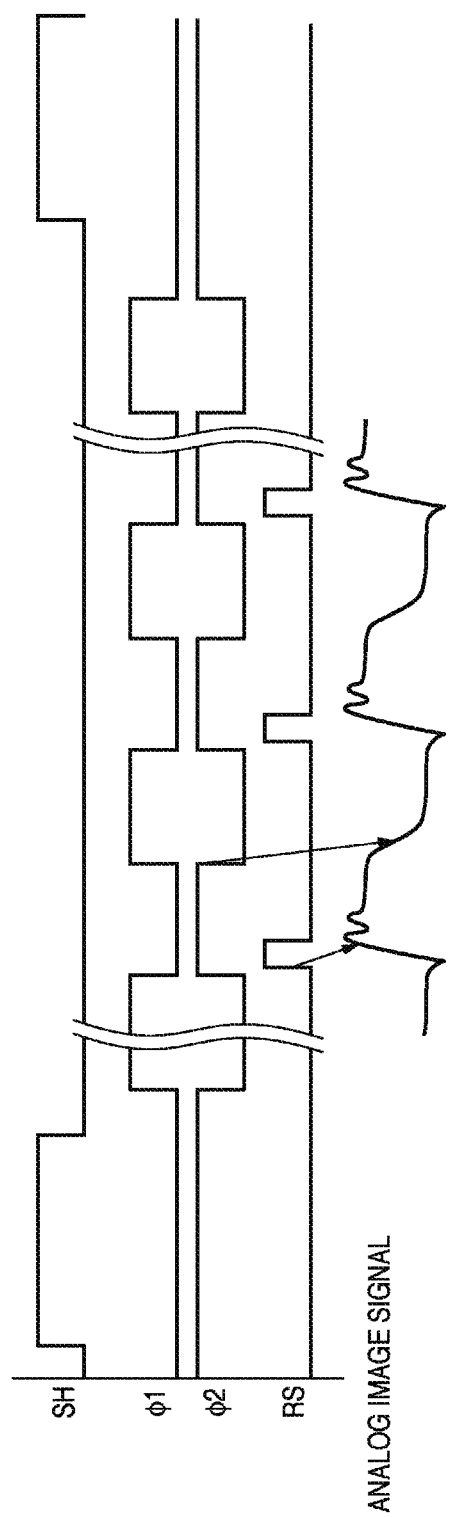

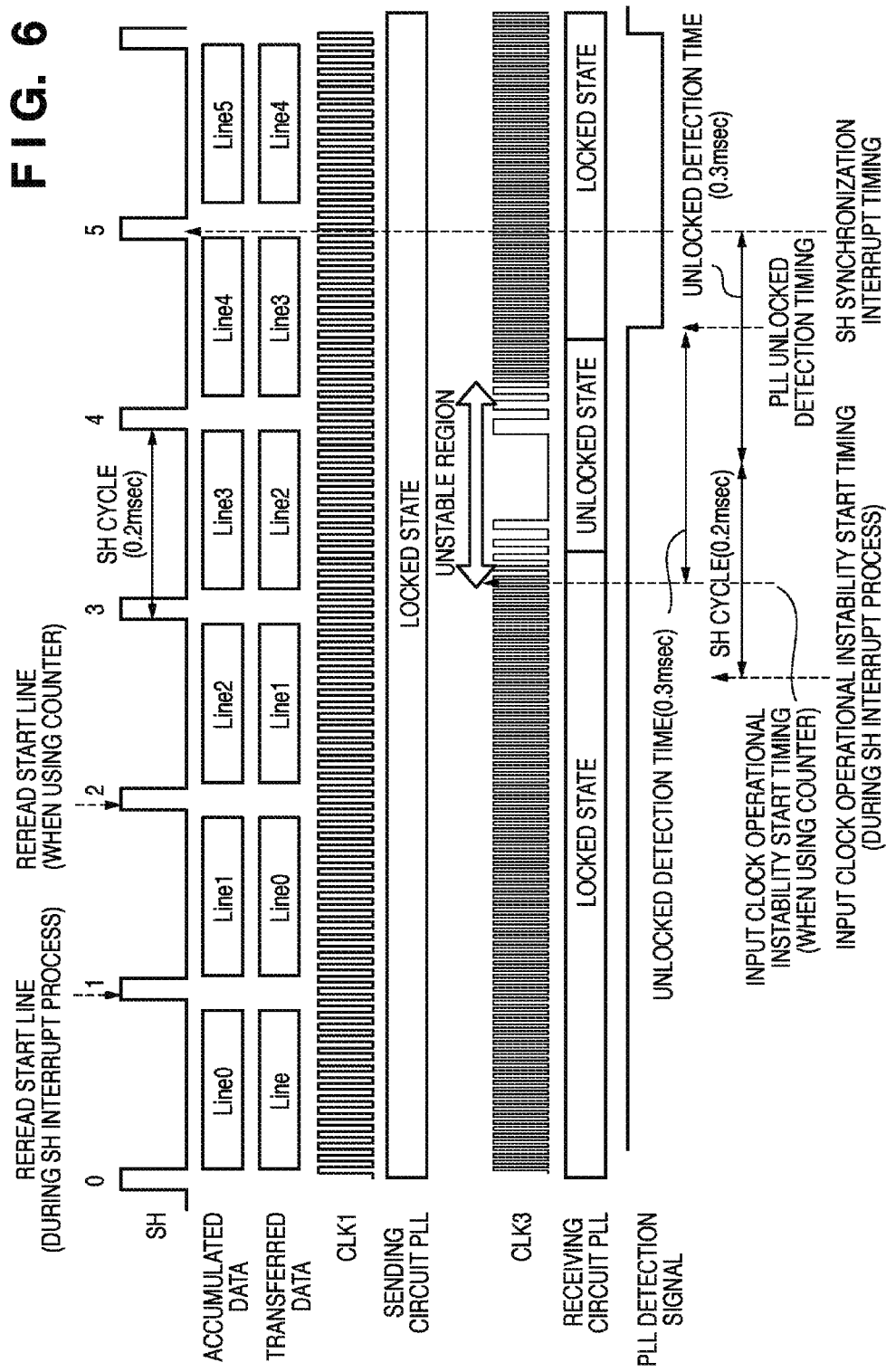

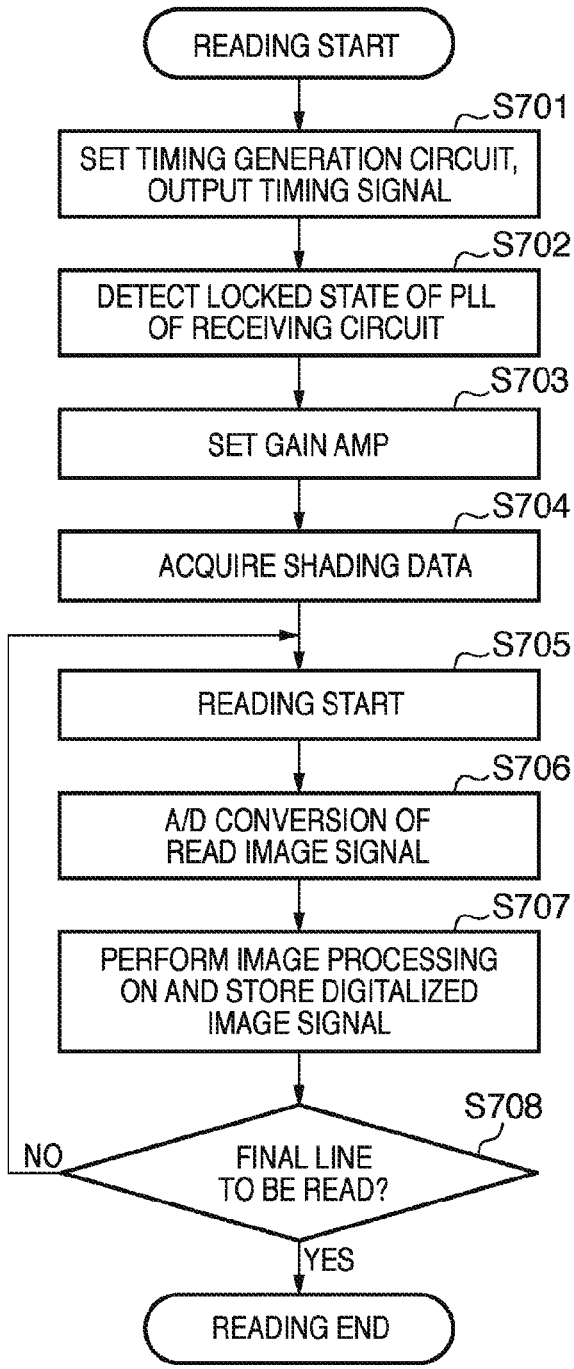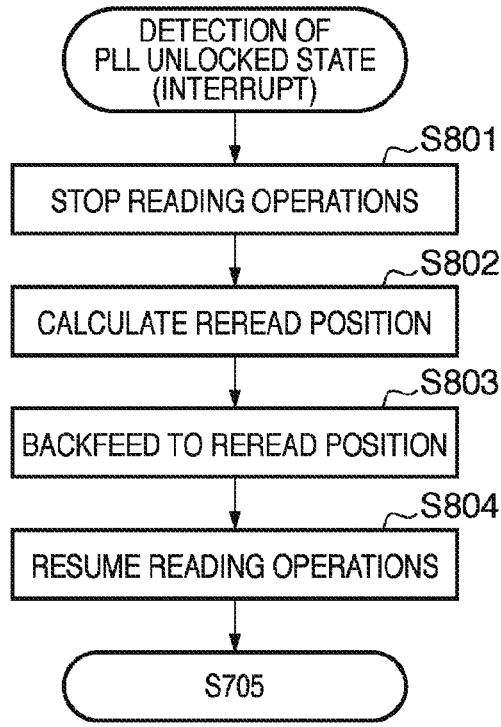
FIG. 7A
FIG. 7B

READING APPARATUS

BACKGROUND OF THE INVENTION

1. Field of the Invention

The present invention relates to a reading apparatus that reads an image.

2. Description of the Related Art

Electronic devices are generally susceptible to the influence of electromagnetic waves emitted by other nearby devices, natural phenomena such as lightning, static electricity generated during user operations, and so on, which can cause drops in performance, erroneous operations, crashes, the loss of recorded content, and so on if no measures are taken. Therefore, various types of electronic devices are required to meet certain EMS (Electro Magnetic Susceptibility) standards established by government regulations, self-imposed rules created by industry groups, and so on. It is necessary for the designers of electronic devices to balance EMS regulations with device performance, and thus measures involving electric circuit-based techniques that eliminate the influence of external electromagnetic waves, configuration-related techniques that surround electric circuits with metallic mechanical housings to inhibit the penetration of electromagnetic waves, and so on have been taken.

An image reading apparatus, which is an example of an electronic device, is primarily configured of an image sensor, an AD converter, and a digital circuit including logic circuits, memories, a CPU, and so on. Because the respective semiconductor processes differ from one another, it is rare for these elements to be fit into a single integrated chip. It is thus often the case that the elements are wired upon a board with a certain degree of distance therebetween. Meanwhile, particularly with image reading apparatuses that read original documents by scanning those documents in the sub scanning direction with a one-dimensional image sensor, it is often the case that the board on which the image sensor is provided and the board on which the CPU is provided are connected by a long wire such as a FFC (flexible flat cable). For example, an FFC that is several tens of cm to nearly 1 m is used in an image reading apparatus that reads A4-sized original documents.

In the case where the board is divided into multiple sections and electric signals are exchanged between separate boards through cables, impedance generally arises among the respective board ground potentials, which makes it impossible to commonalize the ground potentials at high frequencies. For this reason, the apparatus performs poorly with respect to electromagnetic waves from the exterior, noise, fluctuations in the ground potential, and so on. Meanwhile, the tendency for the cable that connects the boards to act as an antenna and receive electromagnetic waves from the exterior increases.

For such reasons, the image reading apparatus is susceptible to the influence of external electromagnetic waves, static electricity, and so on. Accordingly, if the apparatus has operated erroneously during the reading of an image and there is no configuration for detecting the erroneous operation, the quality of the read image cannot be maintained, the image will be lost, or the like.

Japanese Patent Laid-Open No. 2003-324350 (referred to as "Patent Document 1" hereinafter) discloses a technique for detecting erroneous operations in a PLL of an image reading apparatus. According to Patent Document 1, the number of clocks generated by the PLL among the synchronization signals in a single line is counted; when the result of the counting does not match a set count number, it is determined that the clock has not been properly supplied and a PLL error has occurred, and the operation of the apparatus is stopped.

However, the technique disclosed in Patent Document 1 is a technique that proposes a method for detecting the lock state (synchronization state) of a PLL that has been designed specifically for an image reading apparatus. In other words, Patent Document 1 aims to detect problems and instabilities (out-of-synchronization states) in the operations of the PLL alone, and does not take into consideration sudden operational instabilities occurring in the PLL during image reading, recovery procedures for reading operations, and so on.

SUMMARY OF THE INVENTION

An aspect of the present invention is to eliminate the above-mentioned problems with the conventional technology. The present invention provides a reading apparatus that, in the case where a PLL has been detected as being out of synchronization, returns a reading position by a predetermined amount and reads an image.

The present invention in its first aspect provides a reading apparatus comprising: a sensor configured to read an original document image; a signal generation unit configured to generate a timing signal for driving the sensor; a sending unit configured to send data output from the sensor; a receiving unit configured to receive the data sent from the sending unit via a cable; an image processing unit configured to perform image processing on the data received by the receiving unit; a Phase Locked Loop circuit provided in at least one of the signal generation unit, the sending unit, and the receiving unit; and a control unit configured to detect a predetermined operational state in the Phase Locked Loop circuit and controls the reading apparatus.

According to the present invention, it is possible to, in the case where a PLL has been detected as being out of synchronization, return a reading position by a predetermined amount and read an image.

Further features of the present invention will become apparent from the following description of exemplary embodiments with reference to the attached drawings.

BRIEF DESCRIPTION OF THE DRAWINGS

FIG. 2 is a diagram illustrating an example of a timing signal.

FIG. 6 is another diagram illustrating operations for detecting an unlocked state in a PLL.

FIGS. 7A and 7B are diagrams illustrating a processing procedure for controlling reading operations according to an embodiment.

FIG. 9A is a plan view of an image reading apparatus, whereas

DESCRIPTION OF THE EMBODIMENTS

Figure 1:
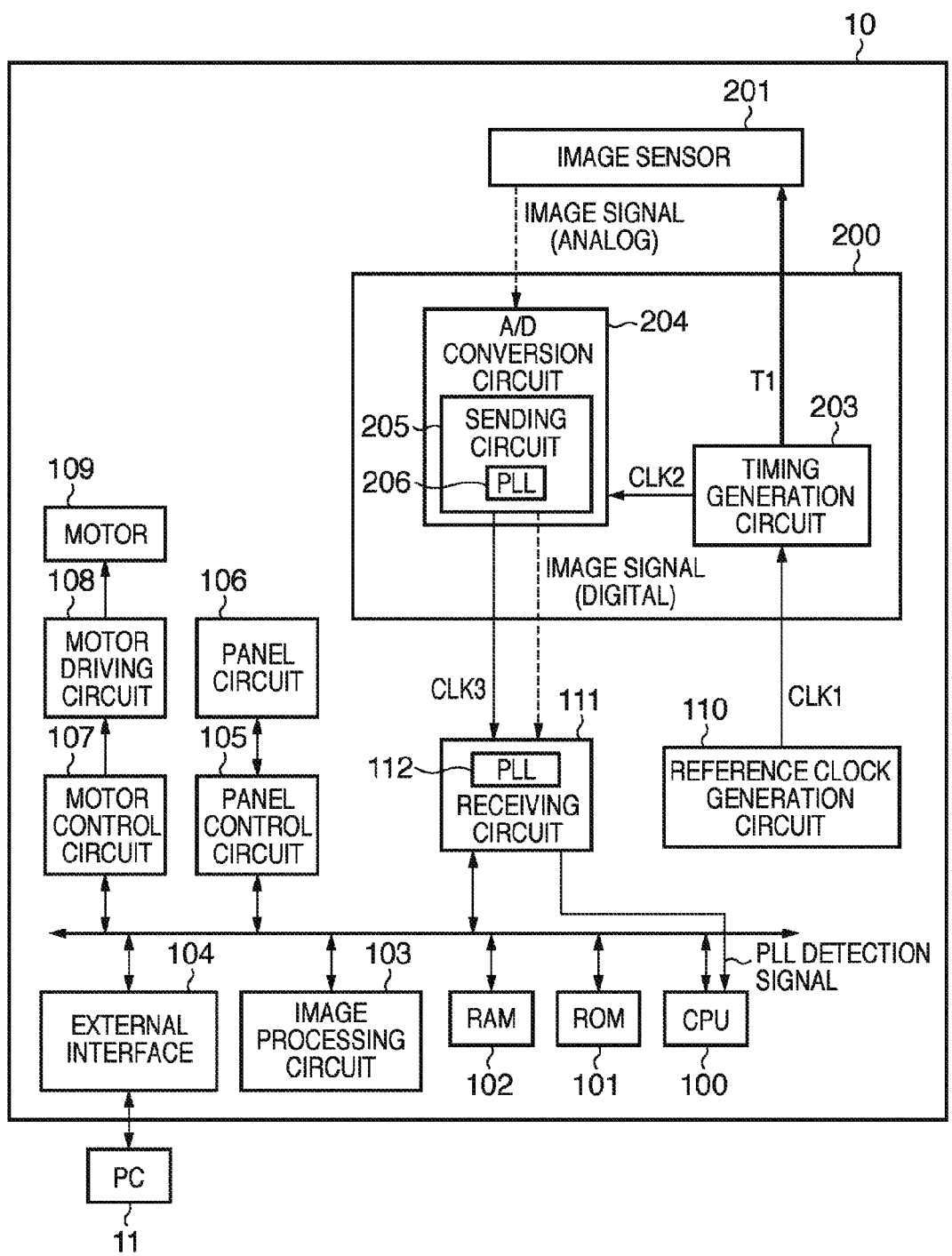
FIG. 1 is a diagram illustrating the overall configuration of a reading apparatus according to an embodiment of the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be given identical reference numerals, and descriptions thereof will be omitted.

FIG. 1 is a diagram illustrating the configuration of an image reading apparatus 10 according to an embodiment of the present invention. The image reading apparatus 10 includes a motor 109, a motor driving circuit 108 that drives the motor 109, a motor control circuit 107 that controls the motor driving circuit 108, an image sensor 201, an image processing circuit 103, and an image reading circuit 200. The image reading apparatus 10 also includes a CPU 100, a ROM 101, a RAM 102, an external interface 104 for exchanging data with an information device such as a PC 11, a panel circuit 106 through which a user inputs instructions, and a panel control circuit 105 that controls the panel circuit 106. The image reading circuit 200 includes a timing generation circuit 203 that generates sensor driving signals and an A/D conversion circuit (signal processing unit) 204 that converts analog signals output by the image sensor 201 into digital signals. A sending circuit 205 and a receiving circuit 111 include PLL (Phase Locked Loop) units (PLL circuits) 206 and 112, respectively, and transfer image data, carry out serial-parallel conversion, and so on. A PLL detection signal from the PLL unit 112 is physically connected by a wire to an LSI circuit in which the CPU 100 is provided, and the signal level is held by a predetermined register or is input into the CPU 100 as an interrupt signal. The signal generated by the timing generation circuit shown in FIG. 1 is used as a PLL reference clock signal. The image sensor 201 and the A/D conversion circuit 204 are provided on a sensor board. The other circuits (the CPU 100, the image processing circuit 103, a reference clock generation circuit 110, the receiving circuit 111, and so on) are provided on a control board. The sensor board and the control board are connected by a cable. A clock signal CLK1, a clock signal CLK3, and image signals are transferred through this cable.

When a user depresses a key switch (not shown) in the panel circuit 106, the CPU 100 sends a reading start command to the image reading circuit 200 and the motor control circuit 107. The motor control circuit 107 spools up the motor 109 based on a predetermined speed table, and maintains a constant speed thereafter. When the scanning speed of the image sensor 201 reaches a constant speed and the image sensor 201 has moved to a predetermined reading start position, the timing generation circuit 203 supplies a timing signal T1 to the image sensor 201 and an A/D converter clock CLK2 to the A/D conversion circuit 204 in response to commands from the CPU 100. An analog image signal that has undergone photoelectric conversion is obtained by the A/D conversion circuit 204 and is converted into digital data, after which the digital data is sent to the receiving circuit 111 by the sending circuit 205. The receiving circuit 111 receives the image signal and stops obtaining the image signal when the sensor has moved to a reading end position. After this, the motor is spooled down, and once the motor has stopped, the sensor is returned to the reading start position and the image reading process ends.

Figure 9A:
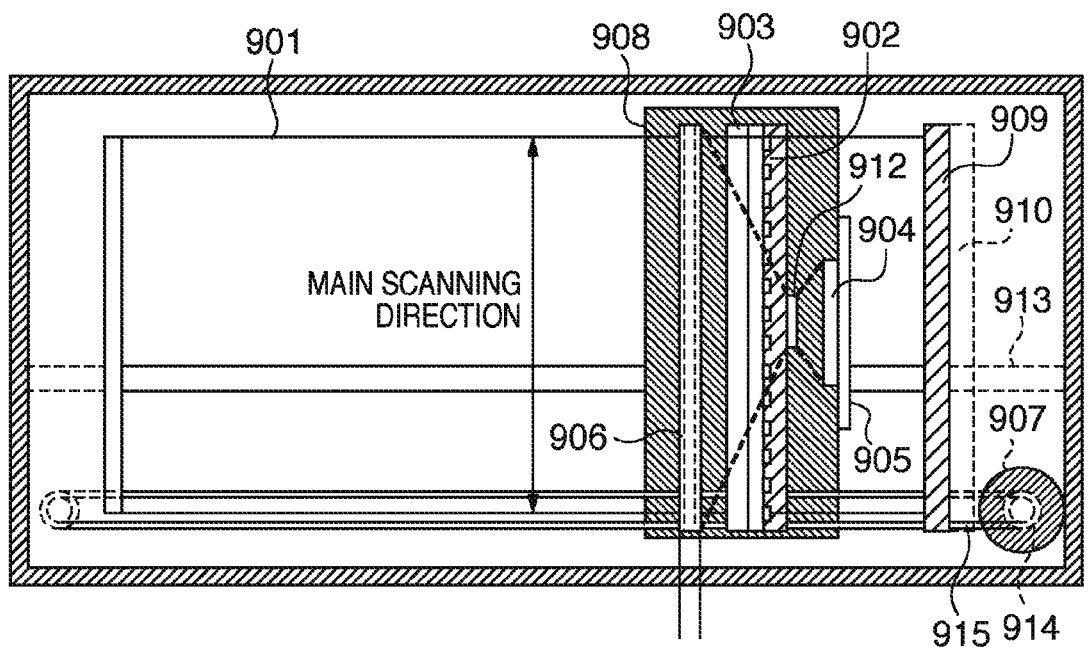
Figure 9B:
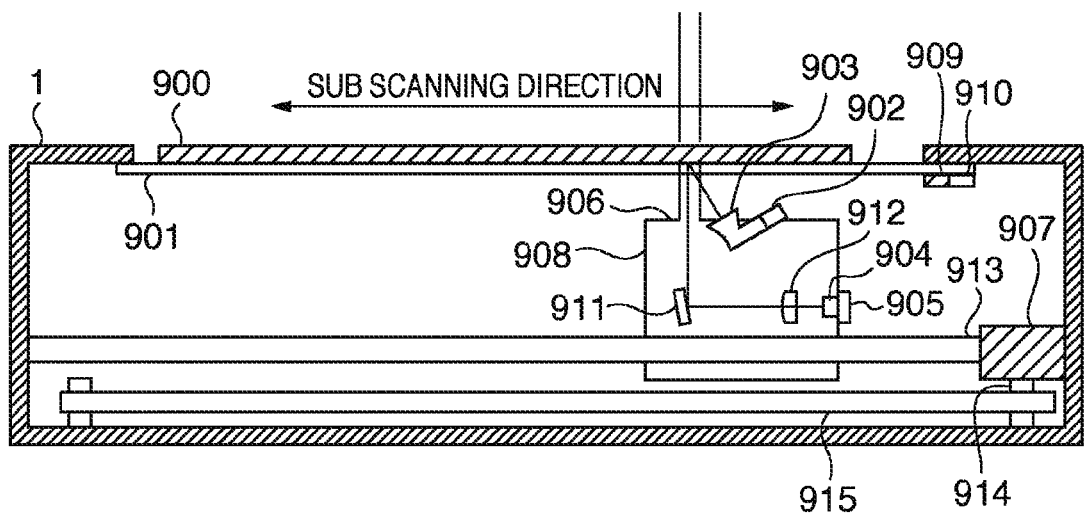
FIG. 9B is a cross-sectional view of an image reading apparatus.

In the present embodiment, the driving timing of the motor that is performing image reading is generated based on the timing generation circuit 203, which is for reading devices. Here, a line synchronization signal may furthermore be generated from the driving timing of the motor. The digital image signal that was digitized by the A/D conversion circuit 204 is input into the image processing circuit 103, and, after a predetermined image process is carried out thereupon, is saved in the RAM 102 or sent to the PC 11 via the external interface 104, which is of a type such as USB. FIG. 9A is a plan view of an image reading apparatus, whereas FIG. 9B is a cross-sectional view of an image reading apparatus. In FIG. 9B, a reading unit 908 scans in the sub scanning direction (from the right to the left), thus reading an original document 900 that has been placed upon a document support glass 901. The reading unit 908 irradiates the original document 900 with light output from light-emitting elements 902 via a transparent material 903. The light reflected therefrom is detected by a sensor 904 via a slit 906, a mirror 911, and a lens 912. The sensor 904 corresponds to the image sensor 201 illustrated in FIG. 1. The sensor 904 is provided on a sensor board. The image reading circuit 200 illustrated in FIG. 1 is also provided on this sensor board. Multiple light-emitting elements 902 are arranged in the main scanning direction. A motor 907 is a driving source, and the reading unit 908 moves due to the driving force of the motor 907 supplied via a gear 914 and a belt 915. Prior to carrying out reading operations, the reading unit 908 is positioned using calibration that employs a white reference member 910, and using an edge detection member 909.

FIG. 2 is a diagram illustrating details of the timing signal T1 generated by the timing generation circuit 203. As shown in FIG. 2, the timing signal T1 includes a one-line synchronization signal SH, a reset signal RS for an amplifier that amplifies the output of the image sensor 201, analog shift register transfer clocks Φ1 and Φ2 for the case where the image sensor 201 is a CCD, and so on. These are generated through division or multiplication within the timing generation circuit 203 using the clock signal CLK1 generated by the reference clock generation circuit 110 illustrated in FIG. 1 as a reference. Meanwhile, the clock signal CLK2, which is synchronized with the aforementioned timing signal T1, is supplied to the A/D conversion circuit 204. Accordingly, it is possible to obtain an image signal that is synchronized between the image sensor 201 and the A/D conversion circuit 204.

Figure 3A:
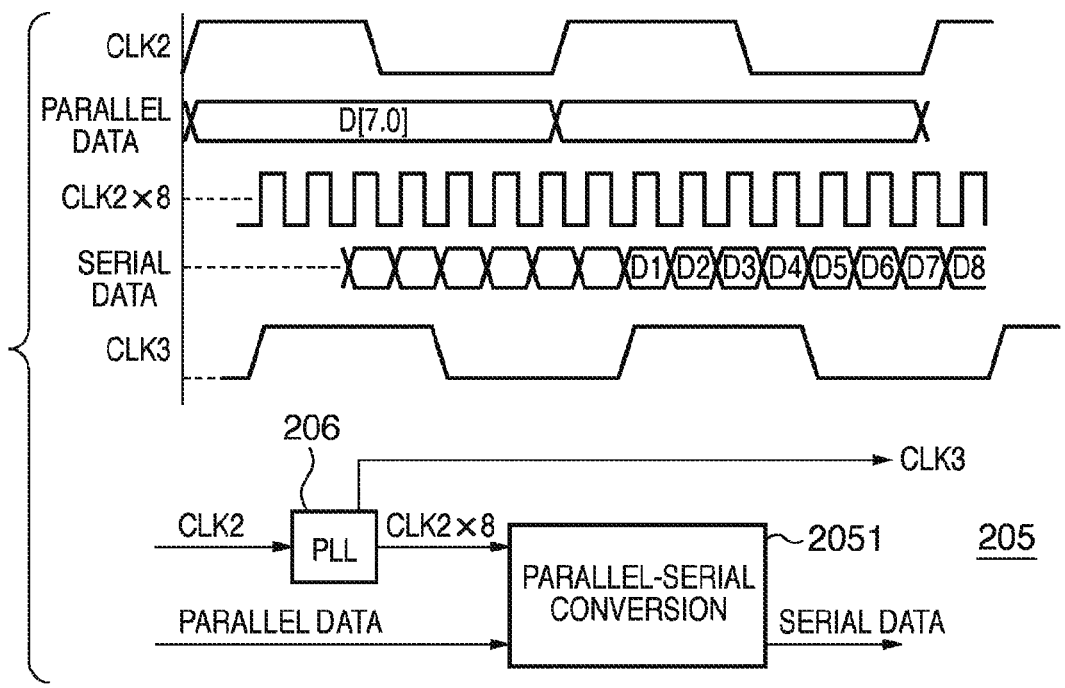
FIGS. 3A and 3B are diagrams illustrating timing charts for a sending circuit and a receiving circuit.
Figure 3B:
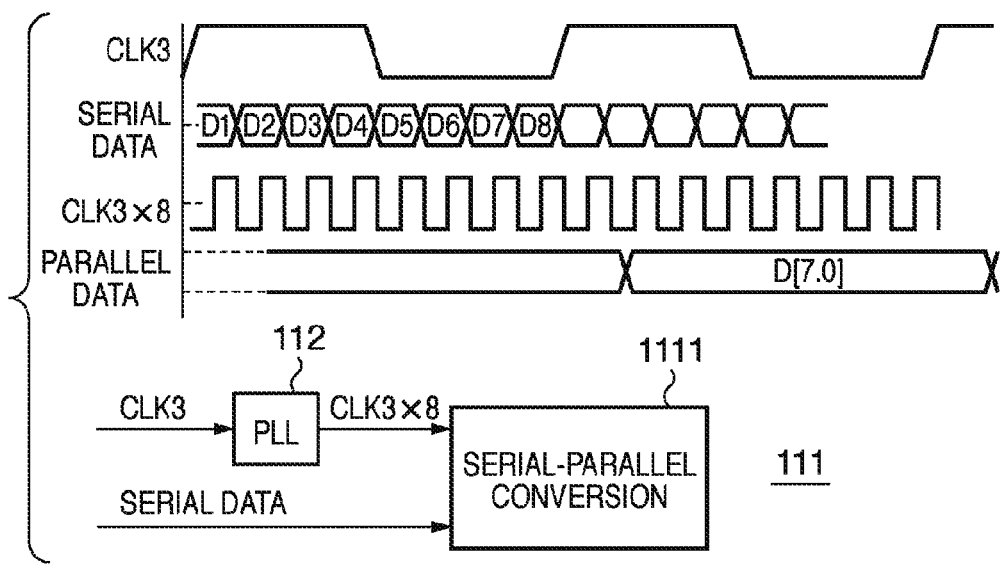

The PLL unit 112 is provided within the receiving circuit 111, and receives clocks and data. FIGS. 3A and 3B are timing charts illustrating an example of a transfer method for clock signals and data [image signal]. In FIGS. 3A and 3B, the receiving circuit 111 operates based on a clock signal obtained by multiplying the clock signal CLK3. For example, serial-parallel conversion 1111 is carried out based on a clock signal in which the clock signal CLK3 has been multiplied by 8 in the receiving circuit 111. Employing such a configuration makes it possible to suppress the operational frequency of the clock signal to a low frequency, taking into consideration the fact that compared to data signals, clock signals have a constant frequency and thus the high-frequency components of the clock signals are more easily emitted to the exterior of the device as unnecessary electromagnetic waves. Meanwhile, it is necessary to multiply the clock frequency that has been lowered by the sending circuit 205 and restore that frequency to the frequency of the data signal, and thus the PLL unit 112 for clock multiplication is provided in the receiving circuit 111.

In the sending circuit 205 as well, transferring the data signal as-is as parallel data across the board causes an increase in the number of signals, space, and so on, and thus the data is transmitted having first serialized the data and raised the operational frequency. The sending circuit 205 carries out parallel-serial conversion 2051 based on a clock signal obtained by multiplying the clock signal CLK2 by 8. The sending circuit 205 then outputs the clock signal CLK3 that synchronizes with the clock signal CLK2 to the receiving circuit 111. With the circuit configuration of the image reading circuit 200, the CLK1, CLK3, and digital image signal are transmitted through a flat cable. In this case, rather than based on the normal CMOS/TTL logic, the signal driving circuit often employs a configuration that suppresses the influence of unnecessary electromagnetic waves by using two differential signals having low amplitudes, as represented by LVDS. Note that the method for exchanging data between the sending circuit 205 and the receiving circuit 111 is not particularly limited to the method shown in FIGS. 3A and 3B. For example, rather than multiplying and transmitting the sending clock signal CLK3, the clock signal CLK3 may be transmitted at the same cycle as the digital image signal. In addition, a technique called an embedded clock, in which a clock recovery circuit that extracts clock information from data signals is used in the receiving circuit 111, may be employed as well. In such as case, the sending clock signal CLK3 is unnecessary. Meanwhile, because a locked/unlocked state also occurs in the PLL circuit within a clock recovery circuit, the present embodiment can be applied even with a transmission method that does not employ a physical clock.

Figure 4:
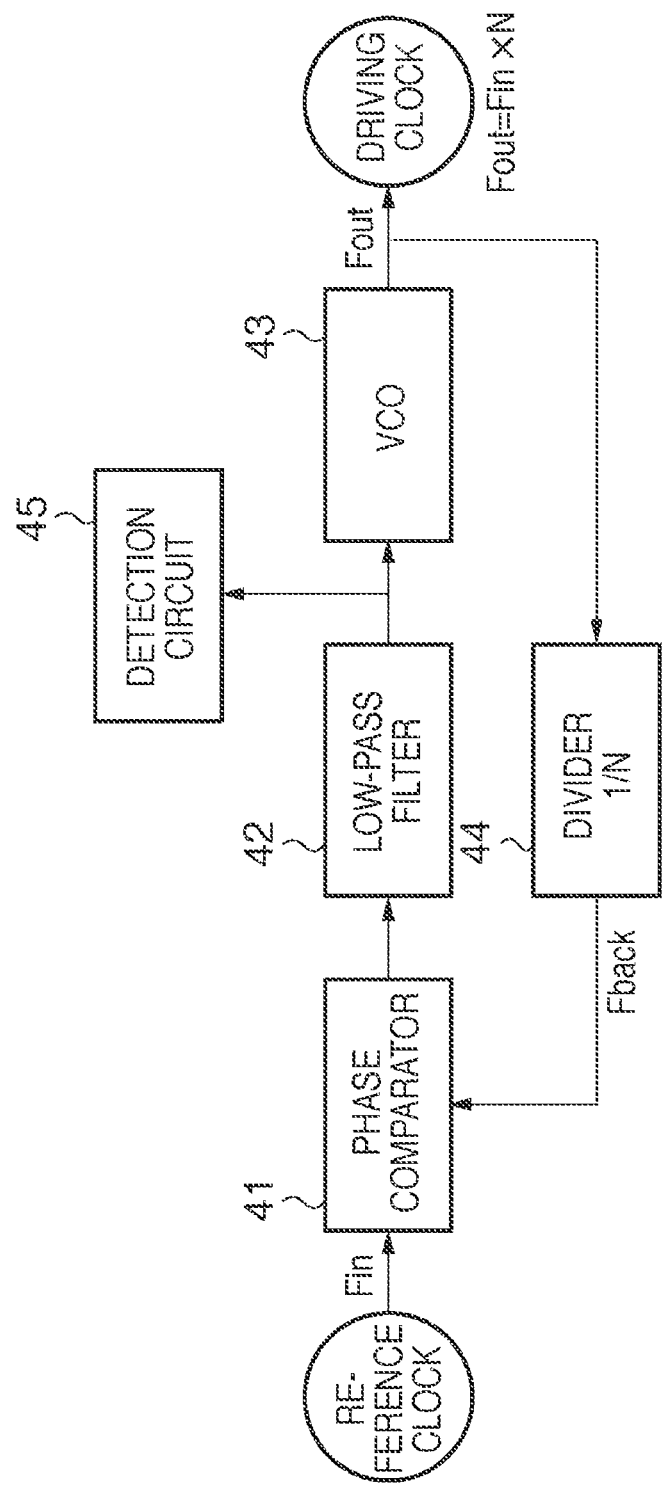
FIG. 4 is a diagram illustrating operations of a PLL circuit.

FIG. 4 is a diagram illustrating the overall configuration of a frequency synthesizer that uses a general PLL circuit. A state in which the frequency of a reference clock signal Fin indicated in FIG. 4 is the same as an Fback frequency is called a state in which the PLL is locked. After the input of the reference clock signal Fin, if the Fback output from a VCO (Voltage Controlled Oscillator) 43 is faster than Fin, an error signal pulse is output from a phase comparator 41. This pulse is smoothed by a low-pass filter 42 and is then input into the VCO 43. Negative feedback occurs as a result, causing the output of the VCO to drop until Fin=Fback and a locked state occurs. Here, as shown in FIG. 4, a divider 44 is inserted between a driving clock signal Fout and Fback, resulting in Fout=Fin×N (a division ratio N), making it possible to obtain an output frequency that is N times the input. A detection circuit 45 detects when the locked state has switched to the unlocked state based on the output value of the low-pass filter 42 and outputs a PLL detection signal. Although the detection circuit 45 is provided in the receiving circuit 111, the detection circuit 45 may be provided within the PLL circuit. Note that the detection circuit 45 may be configured to carry out detection based on the output value of a phase comparator 41, the divider 44, or the like.

As described thus far, due to the principles of its operation, the PLL circuit requires feedback, and requires a set amount of time spanning from when the input of the reference clock signal commences to when the PLL circuit enters the locked state. In addition, the configuration for detecting whether the PLL circuit is in the locked state or the unlocked state, which is not the locked state, can be realized using a method in which an error output pulse from the phase comparator 41, an output voltage from the low-pass filter 42, or the like is monitored. However, it is often the case that the locked state of the PLL circuit cannot be detected without delay. The PLL circuit includes a feedback circuit, an analog circuit, and so on. Normally, PLL-IC makers and vendors that provide PLL macros guarantee that the PLL circuit will enter a locked state or that a locked state detection circuit will determine a locked state within a certain set amount of time (approximately several tens of μsec to several tens of msec). In the case where an IC or a macro is used, these values can be found in advance on the data sheets thereof, and can also be actually measured. Although the example of a PLL circuit is used in the present embodiment, a DLL (Delay Locked Loop) circuit that uses a delay line instead of a VCO may be employed instead. Like the PLL circuit, a locked state or an unlocked state occurs depending on the state of the input clock in the DLL circuit, and thus the present embodiment can be applied in the same manner. The function for detecting whether the PLL circuit is locked/unlocked exists as a failsafe function for confirming that the PLL circuit is operating stably when, for example, the apparatus is turned on. In the present embodiment, the occurrence of image problems is predicted by determining whether the sending clock signal CLK3 input into the PLL circuit is in a stable/unstable operational state using a predetermined function for detecting whether the PLL circuit is locked/unlocked. In the case where it has been determined that the operational state is unstable, the reading operations are suspended and re-executed from before the line that was read during the unstable operational state. As a result, it is possible to obtain only the correct image data as the final image output.

Figure 5:
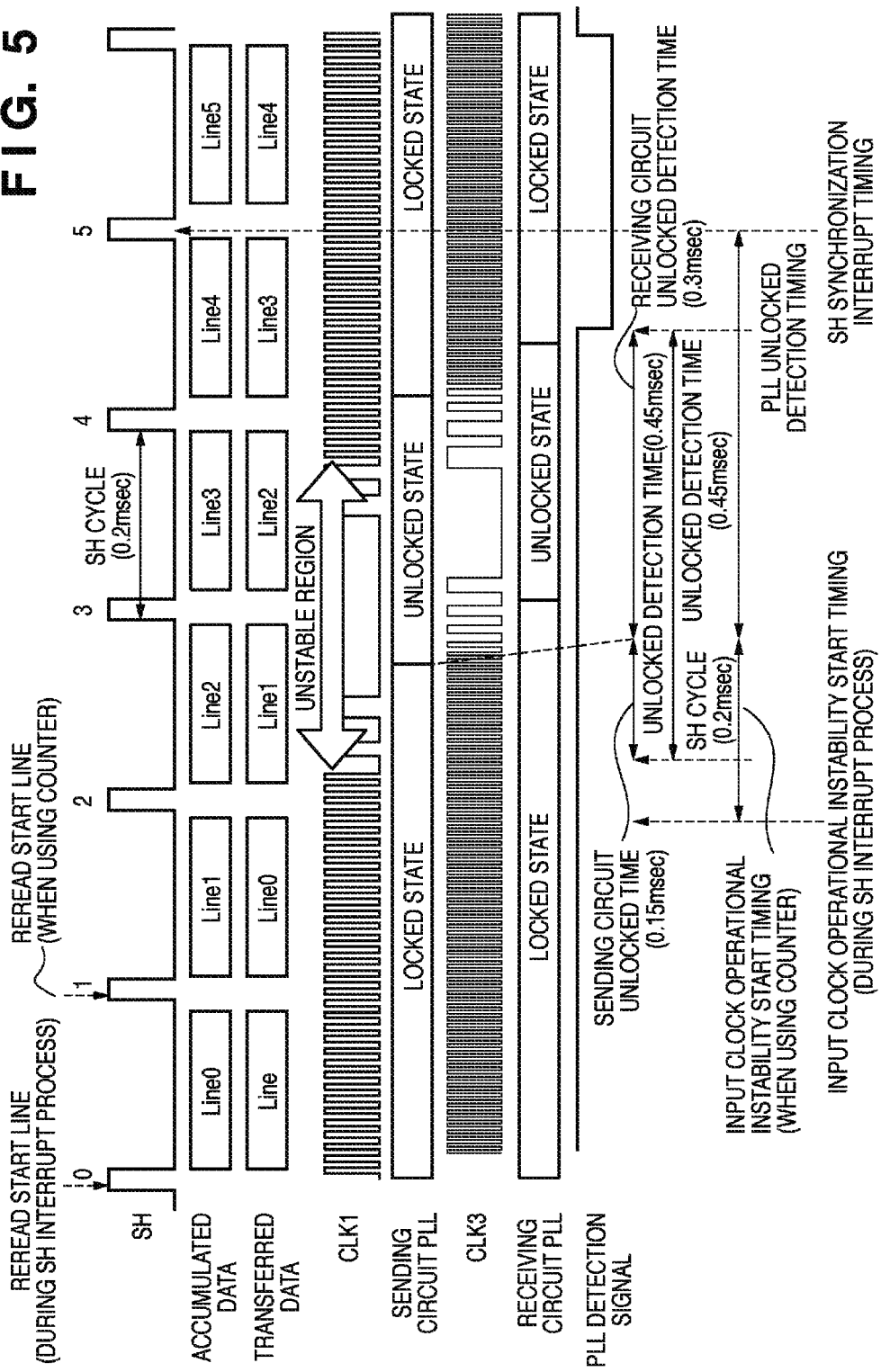
FIG. 5 is a diagram illustrating operations for detecting an unlocked state in a PLL.

FIG. 5 is a diagram illustrating a timing chart of the signals in the image reading circuit 200 in the case where the input clock CLK1 shown in FIG. 1 has become unstable. A PLL lock detection signal indicates a locked state when at H level and an unlocked state when at L level. Here, it is assumed that the amount of time from when the input clock CLK1 becomes unstable to when the unlocked state is detected (an "unlock detection time" indicated in FIG. 5) is 0.45 msec, and that the synchronization signal SH for a single line has a cycle of 0.2 msec.

As shown in FIG. 1, the PLL unit 206 of the sending circuit 205 is present between the CLK1 and the CLK3, and thus the unlock detection time of 0.45 ms is the (sending circuit unlock time)+(receiving circuit unlock detection time). Furthermore, here, the receiving circuit unlock detection time is the (time for movement from locked state to unlocked state)+(detection time of unlock detection circuit) for the PLL unit 112 of the receiving circuit 111.

In the case where the CPU 100 is configured of firmware capable of changing the processing content using an interrupt for each SH, a PLL unlocked state is detected between the fourth and fifth SH, as shown in FIG. 5. In other words, the CPU 100 detects an unlocked state in the PLL unit 112 at the time of the fifth SH interrupt. Upon being recognized by the CPU 100, the normal reading operations are stopped, the apparatus returns to the position where the reading operations became unstable, and the reading operations are carried out again.

As shown in FIG. 5, the unlocked state of the PLL unit 112 is detected at the fifth SH interrupt. For this reason, it is not determined at what time between the fourth and fifth SH the unlocked state has been detected. Accordingly, in the present embodiment, the timing at which to re-execute the reading operations is specified with one line's (an SH cycle) worth of leeway. In other words, in the present embodiment, it is determined that the data of the line at which data accumulation and transfer was being carried out upon returning (unlock detection maximum time 0.45 msec)+(one line synchronization signal cycle 0.2 msec) represents the start of the problem data. In other words, as shown in FIG. 5, it is determined that the operations of the input clock CLK1 have become unstable between the first and the second SH.

In the case of a configuration that employs a generic image sensor such as a CCD, image signal charge accumulation and transfer are carried out in parallel. In the case where the clock CLK1 has become unstable at the timing shown in FIG. 5, the LINE1 data accumulation and LINE0 data transfer are carried out in parallel. Accordingly, in this case, the operation is re-executed from the accumulation of the data of LINE0. As another configuration for ascertaining the timing of the unlocked state of the PLL detection signal, the timing at which the operation of the input clock becomes unstable may be estimated through measurement using a counter. In such a case, the time that is previous to the present by an amount equivalent to the unlock detection time is taken as the timing of the start of instability in the operation of the input clock.

FIG. 6 is a diagram illustrating a timing chart of the signals in the image reading circuit 200 in the case where the sending clock signal CLK3 shown in FIG. 1 has become unstable. In FIG. 6, because only the sending clock signal CLK3 has become unstable, the sending PLL unit 206 operates stably in the locked state. Accordingly, only the unlock detection time of the receiving circuit 111 may be taken into consideration for the unlock detection time. Here, the unlock detection time of the receiving circuit 111 is, like in FIG. 5, the (time for movement from locked state to unlocked state)+(detection time of unlock detection circuit) for the PLL unit 112 of the receiving circuit 111. As with the case illustrated in FIG. 5, when the CPU 100 detects an unlocked state at the timing of the fifth SH interrupt, it is determined that the sending clock signal CLK3 has become unstable at the timing that is previous to the present by the amount equivalent to the unlock detection time and the SH cycle, or in other words, between the second and third SH shown in FIG. 6. As a result, the operation is re-executed from the accumulation of the data of LINE1.

Here, if the operation of the sending clock signal CLK3 becoming unstable can be predicted in advance in light of the layout of the circuitry and wires, it is possible to specify a shorter unlock detection time than the case illustrated in FIG. 5. If the SH cycle and unlock detection time are as shown in FIG. 6, it is possible to reduce the amount returned by a single SH cycle, as compared to FIG. 5.

Regardless of the configurations illustrated in FIGS. 5 and 6, the unlock detection time may be changed to any time from the clock signal CLK1 to the clock signal CLK3 last input into the PLL unit 112 of the receiving circuit 111 in accordance with the portion of the circuit that is likely to become unstable. In the case where the unstable area cannot be limited to a specified portion, the unlock detection time may be estimated assuming that the clock signal CLK1, based upon which the clock signal CLK3 that is input into the PLL unit 112 of the receiving circuit 111 is generated, has become unstable. Doing so makes it possible to carry out image reading having returned an amount equivalent to the number of lines spanning from the current reading position to the optimal position regardless of which portion of the image reading circuit 200 the operations became unstable in during the image reading operations.

FIG. 7A is a flowchart illustrating a normal reading operation procedure according to the reading apparatus, whereas FIG. 7B is a flowchart illustrating a procedure for an image reading control process carried out when an interrupt indicating that the PLL unit has unlocked has been detected. FIG. 7A will be described first. When a user presses, for example, a reading start button (not shown) on the panel, the CPU 100 sets the timing for starting a predetermined reading operation in the timing generation circuit 203 (S701). Upon doing so, the CLK1 is output to the timing generation circuit 203 from the reference clock generation circuit 110 at a constant frequency. The timing generation circuit 203 outputs the timing signal T1 to the image sensor 201 and the A/D converter clock CLK2 to the A/D conversion circuit 204. Next, the PLL unit 206 of the sending circuit 205 enters a locked state after a predetermined amount of time and outputs the clock signal CLK3 to the receiving circuit 111. Then, after a predetermined amount of time, the PLL unit 112 of the receiving circuit 111 enters a locked state. The CPU 100 detects the locked state of the PLL unit 112 of the receiving circuit 111 after standing by for a predetermined amount of time or polling a signal indicating the locked state (S702). After the detection, the CPU 100 sets gain amp of a reading light source (not shown) and the A/D conversion circuit 204, and adjusts the output to a desired range (S703). After this, shading data is obtained (S704), and the reading operations are commenced by operating the motor 109 (S705). The image signal received by the receiving circuit 111 undergoes A/D conversion in the A/D conversion circuit 204 (S706), and after undergoing image processing in the image processing circuit 103, is stored in a storage region of a RAM or the like (S707). At this time, the image signal may be saved in the RAM 102 or transferred to the PC 11 via the external interface 104, which is USB or the like, after undergoing the predetermined image process in the image processing circuit 103. Meanwhile, the image signal in the storage region that has undergone image processing is stored along with information regarding the lines that were read (line information). It is then determined whether or not the current line that was read is the final line to be read (S708). In the case where it has been determined that the line is the final line to be read, the reading ends, whereas in the case where it has been determined that the line is not the final line to be read, the process is repeated from S705.

Next, FIG. 7B will be described. When the CPU 100 detects an unlocked state in the PLL unit after the start of reading in S705 of FIG. 7A, the interrupt process illustrated in FIG. 7B is carried out. In the case where an unlocked state has been detected, the driving of the motor 109 is stopped, and the reading operations are stopped. At this time, the motor 109 stops based on a predetermined acceleration/deceleration table (S801). The CPU 100 calculates a reread position from the aforementioned unlock detection time and SH cycle, and from the current line information stored in S707 (S802). After this, the image sensor 201 backfeeds by an amount of lines to the reread position, taking into consideration the acceleration/deceleration region of the motor 109 (S803), and after the acceleration and operations at a constant speed, the reading operations are resumed from the position at which the reread start position was reached (S804). The processing after this is the same as that starting with S705 in FIG. 7A. At this time, while the reading operations may be carried out again after first confirming that the PLL unit 112 of the receiving circuit 111 has once again entered a locked state, the backfed time is normally sufficient, and thus it is often the case that the PLL unit 112 has definitely entered a locked state. Note also that the reread image data may be written over the image data in the memory, starting with the first memory address in the memory region of the image data that was obtained after the detection of unstable operations. When the reading process spanning to a predetermined reading region has ended, the motor 109 backfeeds and returns to a default position.

Figure 8:
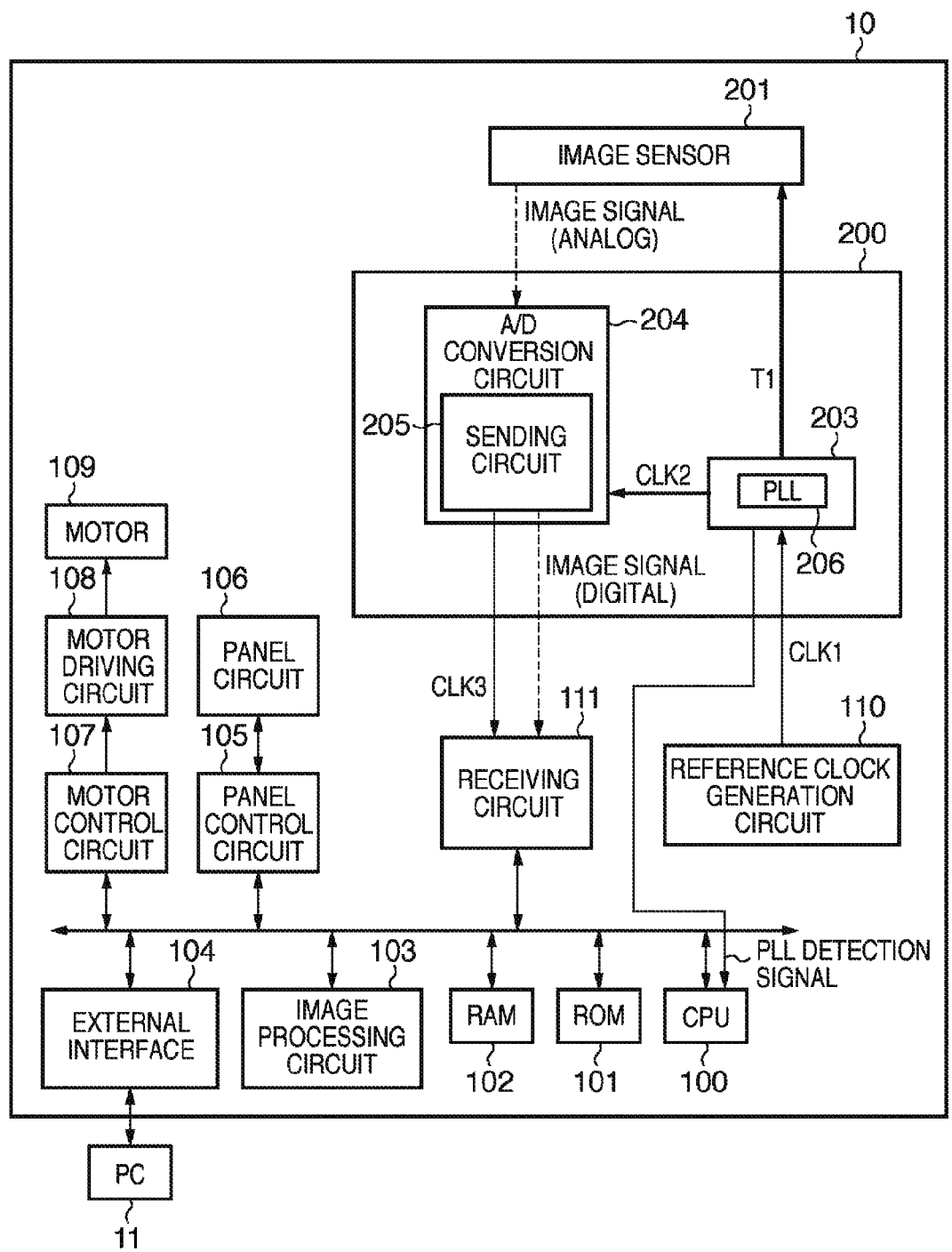
FIG. 8 is a diagram illustrating the overall configuration of a reading apparatus according to a second embodiment of the present invention.

FIG. 8 is a diagram illustrating the configuration of an image reading apparatus 10 according to a second embodiment. Differences from the apparatus illustrated in FIG. 1 will be described, whereas content that is identical to that illustrated in FIG. 1 will be omitted. In the image reading circuit 200, a PLL circuit 206 is provided in the timing generation circuit 203. The PLL circuit 206 outputs transfer clock signals Φ1 and Φ2. The timing generation circuit 203 includes a detection circuit 45 that detects when the PLL circuit 206 is unlocked. Control performed by the CPU 100 based on the PLL detection signal is the same as that described in the first embodiment, and thus descriptions thereof will be omitted.

In the second embodiment, it is predicted whether operational problems with the timing generation circuit 203 will occur by determining stable/unstable operational states of the clock signal CLK1 input into the timing generation circuit 203. In other words, it is possible to predict that an image problem has occurred as a result.

Figure 10:
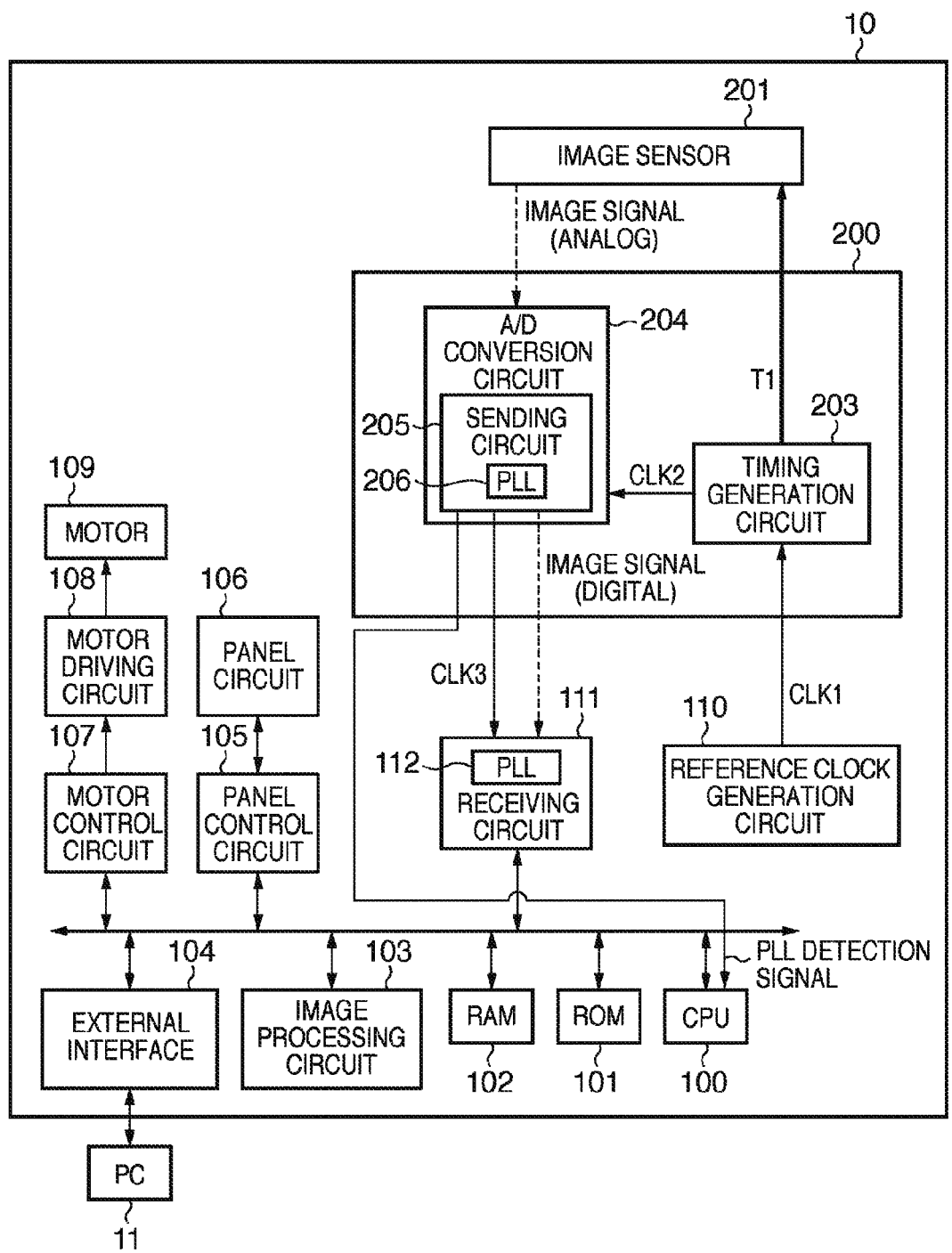
FIG. 10 is a diagram illustrating the overall configuration of a reading apparatus according to another embodiment of the present invention.

FIG. 10 is a diagram illustrating the configuration of an image reading apparatus 10 according to another embodiment. Differences from the apparatus illustrated in FIG. 1 will be described, whereas content that is identical to that illustrated in FIG. 1 will be omitted. The detection circuit 45 provided in the sending circuit 205 outputs a PLL detection signal to the CPU 100. In the configuration illustrated in FIG. 10, it is predicted whether transfer problems with the image signal will occur by determining stable/unstable operational states of the clock signal CLK2 input into the sending circuit 205. In other words, it is possible to predict that an image problem has occurred as a result.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-272798, filed Nov. 30, 2009, which is hereby incorporated by reference herein in its entirety.

What is claimed is:

1. A reading apparatus comprising:
a sensor configured to read an original document image;
a signal generation unit configured to generate a timing signal for driving the sensor;
a sending unit and a receiving unit, wherein the sending unit is configured to send data output from the sensor to the receiving unit via a cable, and wherein the receiving unit is configured to receive the data sent from the sending unit via the cable;
an image processing unit configured to perform an image processing on the data received by the receiving unit;
a Phase Locked Loop unit provided in at least one of the signal generation unit, the sending unit, and the receiving unit;
a detecting unit configured to detect a state of the Phase Locked Loop unit; and
a control unit configured to control the sensor to suspend a reading operation of the sensor responsive to a detection by the detecting unit that the state of the Phase Locked Loop unit changes from a locked state to an unlocked state while the sensor reads the original document image.

2. The reading apparatus according to claim 1, further comprising a moving unit configured to move the sensor;
wherein the control unit controls the sensor to suspend the reading operation by controlling the moving unit to stop moving the sensor.

3. The reading apparatus according to claim 1, further comprising:
a first board configure to include the sensor, the signal generation unit, and the sending unit;
a second board configured to include the receiving unit, the image processing unit, and the control unit; and
an interconnection cable configured to connect the first board and the second board;
wherein the cable by which the data is sent from the sending unit to the receiving unit is comprised at least in part by the interconnection cable.

4. The reading apparatus according to claim 1, wherein the control unit controls the sensor to resume the reading operation after the reading operation is suspended by the control unit.

5. The reading apparatus according to claim 1, wherein the control unit controls the sensor to start the reading operation responsive to a detection by the detecting unit of the locked state of the Phase Locked Loop unit.

6. The reading apparatus according to claim 1, wherein the timing signal includes a synchronization signal, and
wherein the detecting unit detects a change of the state of the Phase Locked Loop unit based on a cycle of the synchronization signal.

7. The reading apparatus according to claim 6, wherein the sensor reads the original document image by one line based on the synchronization signal.

8. The reading apparatus according to claim 1, wherein the Phase Locked Loop unit includes a low-pass filter, a phase comparator, and a divider;
wherein the detecting unit detects the change from the locked state to the unlocked state based on any one of an output of the low-pass filter, an output of the phase comparator, and an output of the divider.

9. The reading apparatus according to claim 1, wherein a clock signal input to the Phase Locked Loop unit is stable in the locked state and is not stable in the unlocked state.

10. A reading apparatus comprising:
a sensor configured to read data of an original document image;
an image processing unit configured to perform an image processing on data read by the sensor;
a transfer unit configured to transfer the data read by the sensor to the image processing unit, wherein the transfer unit includes a Phase Locked Loop unit to which a clock signal is inputted;
a detecting unit configured to detect a state of the Phase Locked Loop unit; and
a control unit configured to control the sensor to suspend a reading operation of the sensor responsive to a detection by the detection unit that the state of the Phase Locked Loop unit changes from a locked state to an unlocked state while the sensor reads the original document image;

wherein the clock signal input to the Phase Locked Loop unit is stable in the locked state and is not stable in the unlocked state.

11. The reading apparatus according to claim 10, further comprising a moving unit configured to move the sensor;
wherein the control unit controls the sensor to suspend the reading operation by controlling the moving unit to stop moving the sensor.

12. The reading apparatus according to claim 10, further comprising:
a first board configured to include the sensor, the signal generation unit, and the sending unit;
a second board configured to include the receiving unit, the image processing unit, and the control unit; and
a cable configured to connect the first board and the second board.

13. The reading apparatus according to claim 10, wherein the control unit controls the sensor to resume the reading operation after the reading operation is suspended by the control unit.

14. The reading apparatus according to claim 10, wherein the control unit controls the sensor to start the reading operation responsive to a detection by the detecting unit of the locked state of the Phase Locked Loop unit.

15. The reading apparatus according to claim 10, wherein the Phase Locked Loop unit includes a low-pass filter, a phase comparator, and a divider;
wherein the detecting unit detects the change from the locked state to the unlocked state based on any one of an output of the low-pass filter, an output of the phase comparator, and an output of the divider.

* * * * *